Patented Dec. 19, 1944

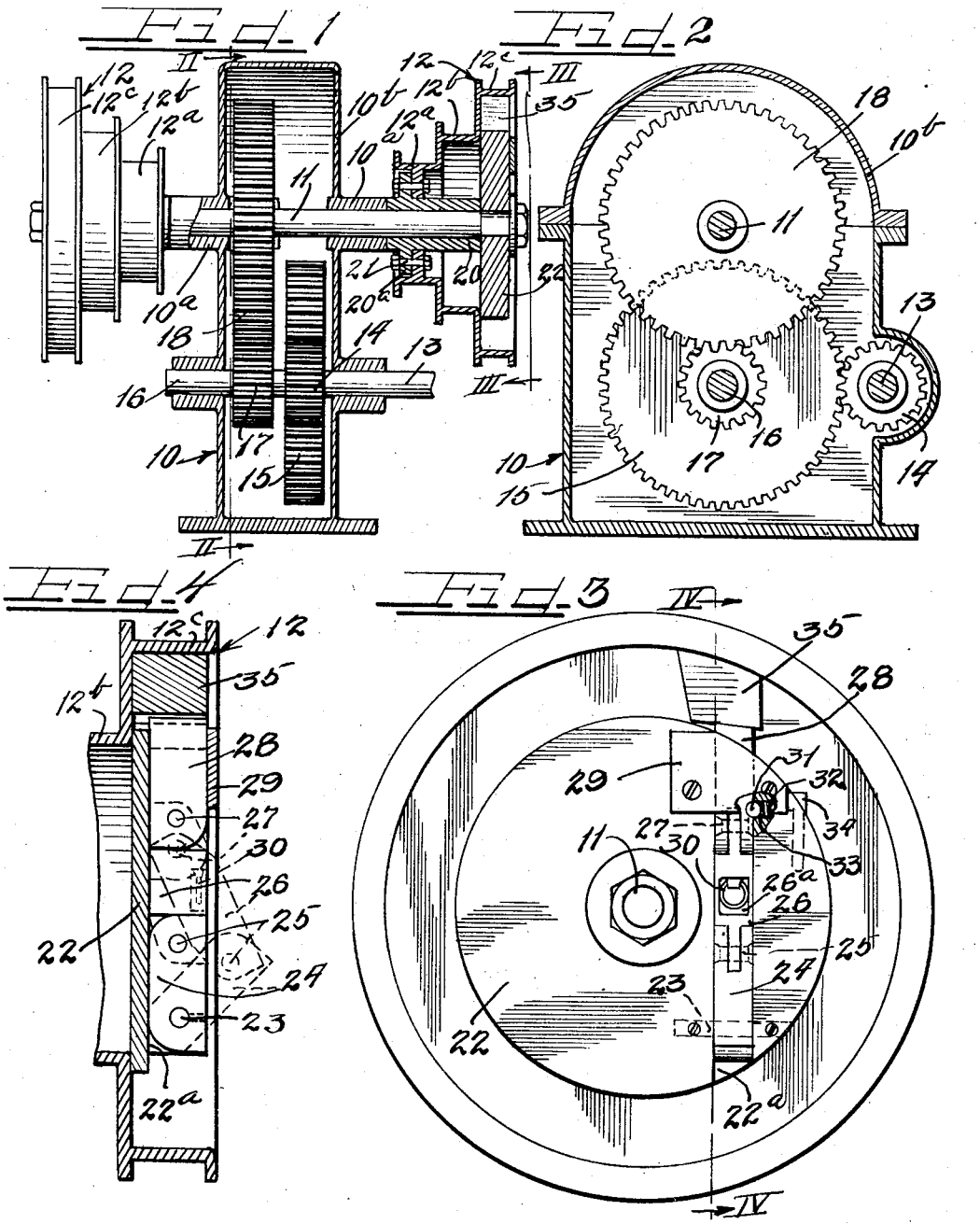

2,365,244

UNITED STATES PATENT OFFICE 2,365,244

CLUTCH MECHANISM

Albert F. Bradley, deceased, late of Sterling, Ill., by Edith Bradley, administratrix, Sterling, Ill., assignor to Northwestern Steel and Wire Company, Sterling, Ill., a corporation of Illinois Original application May 11, 1940, Serial No. 334,515. Divided and this application September 25, 1942, Serial No. 459,671

2 Claims. (Cl. 192—71)

This application is a division of the copending Albert F. Bradley application entitled: "Multi-wire product making machine," Serial No. 334,-515, filed May 11, 1940.

This invention relates to a clutch mechanism especially adapted for use on wire drawing drums of wire product making machines.

Specifically the invention relates to throw out devices or clutches for wire drawing drums adapted to selectively interrupt the feeding of one or more wires through a wire fabricating machine.

In wire product making machines having wire drawing attachments it is desirable to include clutch mechanisms which will permit selective engagement and disengagement of the wire pulling drums without affecting the other parts of the machine. This invention now provides toggle-operated disengaging clutches for the wire pulling drums of wire-fabricating machines. The clutches of this invention can be manually operated so that, for example, a machine capable of handling a plurality of wires can be selectively controlled to stop or start the passage of any one of the wires through the machine.

It is, then, an object of this invention to include, in a wire fabricating machine having a wire drawing end capable of handling a plurality of wires, disengaging clutches adapted to interrupt the operation on any desired wire.

A further object of the invention is to provide a toggle-operated disengaging clutch adapted for controlling a wire pulling drum in a wire fabricating machine.

A further object is to provide a clutch mechanism for operatively connecting driving and driven members through the action of a toggle controlled slidable member.

Other and further objects of the invention will be apparent to those skilled in the art from the following detailed description of the annexed sheet of drawings which, by way of preferred example, illustrates one embodiment of the invention.

On the drawing:

Figure 1 is a transverse vertical cross-sectional view, with parts in elevation, of a wire-drawing drum assembly equipped with toggle-operated clutches of this invention.

Figure 2 is a vertical cross-sectional view taken along the line II—II of Figure 1.

Figure 3 is an enlarged end elevational view taken along the line III—III of Figure 1 with parts broken away in vertical cross section.

Figure 4 is a fragmentary vertical cross-sectional view taken along the line IV—IV of Figure 3.

As shown on the drawing:

As shown in Figures 1 and 2, a housing 10 rotatably supports in bearings 10a a shaft 11 which projects from both sides of the housing and carries wire pulling drums 12 at its ends.

A drive shaft 13 enters the lower portion of the housing and has a gear 14 secured thereon engaging a larger gear 15. The larger gear 15 drives a shaft 16 and another gear 17 on the same shaft 16 meshes with and drives a large gear 18 for driving the shaft 11. The housing 10 thus provides a casing for the gears 14, 15, 17, and 18 and these gears transmit power from the drive shaft 13 to the drum-supporting shaft 11.

The housing has a removable cover 10b at the top thereof permitting access to the interior of the housing.

As shown in Figure 1, each drum 12 includes a plurality of wire drawing pulleys 12a, 12b and 12c of progressively increasing diameter. In a multi-wire product making machine such as is described and claimed in the parent application Serial 334,515 the wire from a first drawing die can be wrapped around the smallest or innermost pulley 12a and passed from this pulley back to the next smaller drawing die. The double drawn wire is then wrapped for a plurality of turns around the pulley 12b, passes back through a third drawing die and the triply drawn wire is then wrapped for a plurality of turns around the largest pulley 12c. The pulleys 12a, 12b and 12c are of progressively increasing diameter so as to compensate for the elongation of the wire caused by the successive drawing dies each of which reduce the initial rod to a lesser diameter and thereupon lengthen the resulting wire.

As shown in Figure 1 the drums 12 are hollow and each drum has disposed therein a sleeve such as 20 which is loosely mounted on the shaft 11. The sleeves such as 20 have outturned flanges such as 20a bolted by means of bolts such as 21 to the innermost pulley 12a. The drums 12 are thus freely mounted on the ends of the shaft 11 and can rotate relative thereto.

Disks such as 22 are keyed to the outermost ends of the shaft 11 and are mounted within the larger pulleys 12c of the driving drums 12. These disks 22 rotate with and are driven by the shaft 11.

Clutches, best shown in Figures 3 and 4, are provided between the disks 22 and the large pulleys 12c of the drawing drums 12 to drive and stop the drums.

As best shown in Figures 3 and 4, the disk 22 has a groove 22a in the outer face thereof. This groove is spaced from the axis of the disk and communicates with the circumference of the disk at its ends. A pin 23 is secured in the disk and extends across the groove near one end thereof to pivotally carry a toggle arm 24 adapted to be seated in the groove and moved out of the groove as shown in dotted lines in Figure 4. The top end of the arm 24 is pinned by means of a pin 25 to a second arm 26 also seatable in the groove 22a. A pin 27 extends through the upper end of the arm 26 and pivotally supports a slide 28 mounted in the groove 22a. A face plate 29 is secured to the disk 22 to hold the slide 28 in the groove 22a. The free end of the slide 28 projects beyond the circumference of the disk 22 when the toggle arms 24 and 26 are aligned and seated in the groove as shown in Figure 3. The arm 26 has a recess 26a in the outer face thereof as shown in Figure 3 and a pull ring 30 is mounted in the recess. The pull ring is adapted to be manually engaged for pulling the toggle arms 24 and 26 out of the groove as shown in dotted line positions in Figure 4 to retract the slide 28 within the confines of the disk 22.

A side wall of the slide preferably has a recess therein to receive a spring pressed detent or ball 31 as shown in Figure 3. For this purpose the disk can be drilled to provide a well 32 receiving the detent or ball 31 and a spring 33 urging the ball into the recess of the slide 28. A pin 34 seated in a well drilled at right angles to the well 32 holds the spring 33 in position.

The pulley 12c of each drum 12 has a wedge block 35 secured under the flange thereof and is adapted to receive the slide 28 in wedged engagement thereagainst when the toggle arms are seated in grooves 22a. Thus rotative movement of the disk 22 is transmitted to the winding drum 12 through the toggle clutch arrangement which effects wedging engagement between the slide 28 and the wedge block 35. When it is desired to stop a drum without stopping the other drums, the pull ring 30 can be engaged and pulled outwardly to retract the slide 28 out of wedging engagement with the block 35. In this manner clutches selectively control the operation of the drum 12 independently of the drive shaft 11 which drives both drums.

What is claimed is:

1. A clutch mechanism for operatively connecting a driving member and a driven member comprising a disk mounted on the driving member for rotation therewith, a slot in the outer face of said disk spaced from a transverse axis thereof, a member slidable in said slot and having its end surface forming a flat face, a wedge block on the driven member having a flat end face thereon for receiving thereagainst the face on said slidable member, the included angle between said faces and the longitudinal axis of said slidable member being such as to provide wedging engagement between said faces when the disc is rotated in a driving direction, and a toggle device for sliding said member into and out of engagement with said wedge block for connecting and disconnecting the driving and driven members.

2. A clutch mechanism for operatively connecting a driving member and a driven member comprising a disk mounted on the driving member for rotation therewith, a slot in the outer face of said disk spaced from a transverse axis thereof, a member slidable in said slot and having its end surface forming a flat face, a wedge block on the driven member having a flat end face thereon for receiving thereagainst the flat face on said slidable member, the included angle between said faces and the longitudinal axis of said slidable member being such as to provide wedging engagement between said faces when the disc is rotated in a driving direction, a toggle device for sliding said member into and out of engagement with said wedge block for connecting and disconnecting the driving and driven members, a well in said slidable member, a recess in said disk opening into the slot therein, and a spring-pressed ball in said recess for seating in said well for holding said faces in said wedging engagement.

EDITH BRADLEY.
*Administratrix of the Estate of Albert F. Bradley, Deceased.*